United States Patent
Sax et al.

(10) Patent No.: US 9,567,190 B2
(45) Date of Patent: Feb. 14, 2017

(54) DEVICE FOR PREVENTING EXCESSIVE SPEED OF A DOOR LEAF CAUSED BY A POWER ACCUMULATOR

(71) Applicant: Inventio AG, Hergiswil (CH)

(72) Inventors: Peter Sax, Zürich (CH); Hansueli Stocker, Immensee (CH)

(73) Assignee: Inventio AG, Hergiswil (CH)

( * ) Notice: Subject to any disclaimer, the term of this patent is extended or adjusted under 35 U.S.C. 154(b) by 0 days.

(21) Appl. No.: 14/439,698

(22) PCT Filed: Oct. 28, 2013

(86) PCT No.: PCT/EP2013/072492
§ 371 (c)(1),
(2) Date: Apr. 30, 2015

(87) PCT Pub. No.: WO2014/067894
PCT Pub. Date: May 8, 2014

(65) Prior Publication Data
US 2015/0284216 A1 Oct. 8, 2015

(30) Foreign Application Priority Data
Oct. 30, 2012 (EP) .................... 12190478

(51) Int. Cl.
*B66B 13/14* (2006.01)
*B66B 13/26* (2006.01)
(Continued)

(52) U.S. Cl.
CPC ............. *B66B 13/143* (2013.01); *B66B 13/06* (2013.01); *B66B 13/26* (2013.01); *E05F 15/40* (2015.01);
(Continued)

(58) Field of Classification Search
CPC ........ B66B 13/143; B66B 13/06; B66B 13/26; E05F 15/40; E05F 15/60; E05F 15/72; H02P 3/14; E05Y 2900/104
(Continued)

(56) References Cited

U.S. PATENT DOCUMENTS 2,526,503 A * 10/1950 Raque ..................... B66B 13/08
49/138
3,051,281 A * 8/1962 Huff, Jr. ................... A62C 2/18
292/201
(Continued)

FOREIGN PATENT DOCUMENTS

JP H04133989 A 5/1992
JP H09242418 A 9/1997
(Continued)

*Primary Examiner* — Michael Riegelman
(74) *Attorney, Agent, or Firm* — Fraser Clemens Martin & Miller LLC; William J. Clemens

(57) ABSTRACT

A device for preventing excess speed, which is caused by an energy store, of a door leaf, includes a door leaf displaceable between an open position and a closed position, an energy store coupled with the door leaf, which energy store provides energy for the closing movement of the door leaf in the event of failure of the electrical energy supply, a door drive coupled with the door leaf, wherein electrical energy can be induced in the door drive when closing movement of the door leaf takes place, and a door control, which activates the door drive and which is suitable for regulation of the speed of movement of the door leaf, wherein the door control is operable by the induced electrical energy when the electrical energy supply fails, and a method of operating an elevator door.

9 Claims, 1 Drawing Sheet

(51) Int. Cl.
*E05F 15/40* (2015.01)
*E05F 15/60* (2015.01)
*E05F 15/72* (2015.01)
*B66B 13/06* (2006.01)
*H02P 3/14* (2006.01)

(52) U.S. Cl.
CPC ............... *E05F 15/60* (2015.01); *E05F 15/72* (2015.01); *H02P 3/14* (2013.01); *E05Y 2900/104* (2013.01)

(58) Field of Classification Search
USPC .............................................. 187/314; 49/360
See application file for complete search history.

(56) References Cited

U.S. PATENT DOCUMENTS

| | | | | |
|---|---|---|---|---|
| 4,529,065 A * | 7/1985 | Kraft | ........................ | B66B 13/08 187/314 |
| 5,347,755 A * | 9/1994 | Jaster | ...................... | E05F 1/046 49/118 |
| 5,701,973 A * | 12/1997 | Tracey | .................... | B66B 13/08 187/315 |
| 5,857,290 A * | 1/1999 | Schnarr | .................... | E05D 13/04 16/102 |
| 5,878,846 A * | 3/1999 | O'Donnell | .............. | B66B 13/08 187/318 |
| 6,098,341 A * | 8/2000 | Gebauer | ................ | E05F 17/004 49/118 |
| 8,510,912 B2 * | 8/2013 | Tarrega Lloret | .......... | E05F 1/16 16/63 |
| 8,727,076 B2 * | 5/2014 | Lee | ......................... | B66B 13/08 187/324 |
| 2002/0003065 A1 * | 1/2002 | Tonna | ..................... | B66B 13/08 187/324 |
| 2006/0175143 A1 * | 8/2006 | Fujita | ..................... | B66B 13/24 187/314 |

FOREIGN PATENT DOCUMENTS

| | | |
|---|---|---|
| JP | H1121052 A | 1/1999 |
| JP | 2003261281 A | 9/2003 |
| JP | 2006197750 A | 7/2006 |

\* cited by examiner

DEVICE FOR PREVENTING EXCESSIVE SPEED OF A DOOR LEAF CAUSED BY A POWER ACCUMULATOR

FIELD

The invention relates to a device for preventing excess speed, which is caused by an energy store (power accumulator), of a door leaf, which can be used in elevator installations.

BACKGROUND

An elevator installation comprises a plurality of shaft doors and a car door, wherein the shaft doors and the car door each comprise a respective door leaf. A shaft door can be opened or closed by a door drive, which is arranged at the car door, when the car door is coupled with the shaft door. A door closing device is usually arranged at each of the shaft doors so as to be able to close or keep closed this shaft door at all times by means of a closing force.

In the event of failure of the electrical energy supply the door closing device has the effect that the opened shaft door and possibly the car door coupled with the shaft door are closed. Because in that case a holding moment of the door drive is no longer provided, the acceleration forces caused by this door closing device can produce kinetic energy, which lies above legal limits, of the door leaves. That can lead to, inter alia, risk to or annoyance of persons present in the region of the elevator door.

JP-A-2003261281 shows an elevator door with a door leaf and a motor coupled with the door leaf. In the event of failure of the power supply the door leaf is accelerated in closing direction, whereupon the motor generates electrical energy. The electrical energy is converted by means of resistances into heat which leads to braking of the door leaf. However, it is disadvantageous that costly resistances of that kind have to be used. Moreover, it is disadvantageous that regardless of the position of the door leaf there is braking which, in the case of power failure occurring with an at least partly open elevator door, can lead to lengthy closing times.

SUMMARY

It is therefore the object of the invention to provide an elevator door which has not only improved closing behavior, but also a reduction in closing time in the event of failure of the electrical energy supply.

The object is fulfilled by a device for preventing excess speed, which is caused by an energy store, of a door leaf of an elevator door. The device comprises a door leaf, which is displaceable between an open position and a closed position, an energy store coupled with the door leaf, which energy store provides the energy for the closing movement of the door leaf in the event of failure of the electrical energy supply, a door drive, which is coupled with the door leaf, wherein electrical energy can be induced in a door drive in the case of closing movement of the door leaf, and a door control activating the door drive, wherein the door control is suitable for regulation of the speed of movement of the door leaf and wherein the door control is operable by means of the induced electrical energy in the event of failure of the electrical energy supply.

The object is equally fulfilled by an elevator door with such a device.

The object is also fulfilled by a method of operating an elevator door, comprising the method steps:

in the event of failure of the electrical energy supply, an energy store produces a closing movement of a door leaf, the closing movement of the door leaf causes induction of electrical energy in a door drive and a door control is operated by means of the induced electrical energy when the electrical energy supply fails.

The invention is based on recognition that the energy store in the case of power failure provides potential energy for closing the at least one door leaf. The door leaf consequently accelerating into the closed position accordingly has, after a definable time, energy attributable to its rising speed, which energy on the one hand is too high, but on the other hand is usable. For utilization of this excess energy the circumstance is exploited that the door leaf is so coupled with the door drive that the door drive, which is essentially formed by an electric motor, for example a permanent magnet motor, is drivable by the door leaf. The excess energy can be converted into electrical energy with the help of this door drive. The electrical energy generated in that way is employed for activation or for operation of the door control for the purpose of a controlled closing movement, in which case operation of the door control is maintained as long as possible. Accordingly, for maintenance of operation of the door control use can be made of the proportion of the potential energy of the energy store which in the case of non-regulation would cause a further increase in speed of the door leaf during the closing movement. By contrast to pure braking of the door leaf, it is possible in that way to guarantee a closing movement which is as fast as possible and gentle.

In a development of the device the door control is constructed in such a way that the door control in the event of failure of the electrical energy supply regulates the speed of movement speed of the door leaf. In a development of the method the door control executes regulation of the movement speed of the door leaf. A controlled closing movement can be achieved by means of regulation of the movement speed of the door leaf without parameters such as the mass of the door leaf or friction of the door leaf at other components of the elevator door having to be included. For this purpose, the door control preferably comprises at least one sensor element which generates speed information signals and which provides a signal, which corresponds with the speed of the door leaf, when the door control is activated. The sensor element can also be constructed in such a way that it can generate position information signals, whereby it is possible to provide a signal which allows a conclusion to be made not only about the speed, but also about the position of the door leaf.

In a development of the device the energy store is a closing spring or a closing weight. It is possible with the help of a closing spring or a closing weight to accelerate the door leaf as rapidly as possible. Accordingly, the door control can be activated shortly after start of the closing movement of the door leaf and the closed position of the door leaf can be reached as rapidly as possible.

In a development of the device the door control is activatable in the case of an activation speed of the door leaf. In a development of the method the door control is activated in the case of an activation speed of the door leaf. When the door leaf has such an activation speed, the door control can be placed in a position of taking up regulation of the closing movement. Accordingly, braking of the closing movement of the door leaf can take place from this point in time.

In a development of the device the door control is operable in the case of a movement speed of the door leaf which is equal to or greater than a minimum movement speed. In a development of the method, the door control produces regulation of the movement speed to be greater than or equal to a minimum movement speed so as to be able to maintain operation of the door control. The minimum movement speed of the door leaf indicates what speed of the door leaf is required, as a minimum, in order to supply the door control with electrical energy. It can thereby be ensured that the door control can be operated for as long as possible.

In a development of the method, regulation of the movement speed causes braking of the accelerated closing movement of the door leaf to a specific value. In that way, excessively high movement speeds of the door leaf can be prevented.

DESCRIPTION OF THE DRAWINGS

The invention is explained in more detail in the following by way of figures, in which.

DETAILED DESCRIPTION

Figure 1:
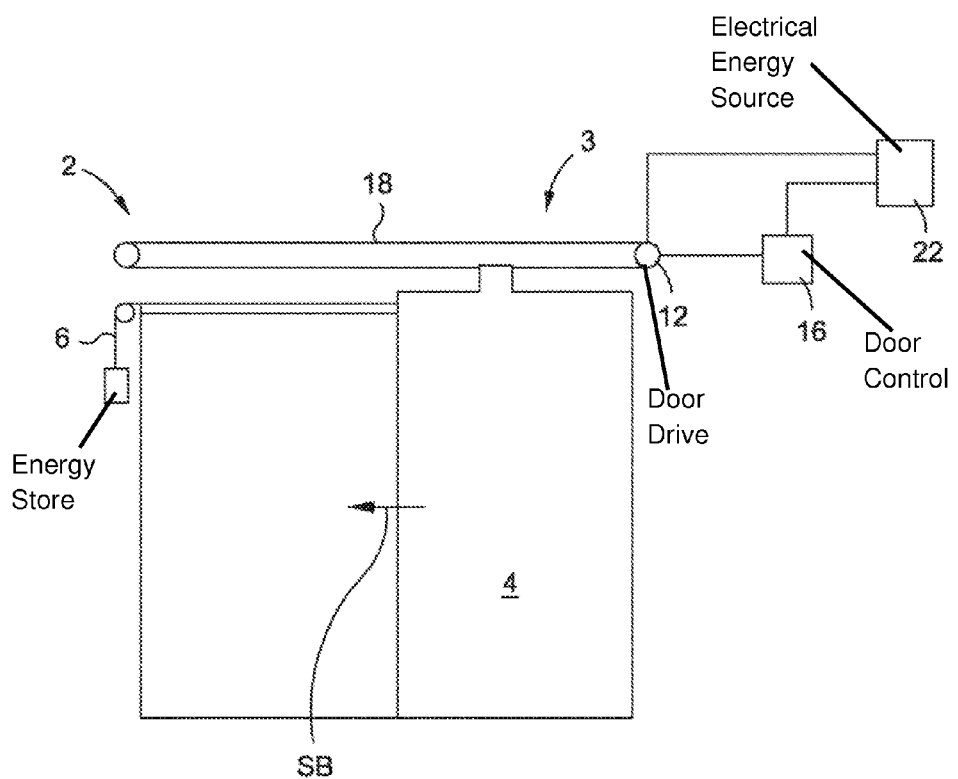
FIG. 1 shows an elevator door of an elevator installation in an open position.

FIG. 1 shows an elevator door 2 of an elevator installation in an open position with a device 3 for preventing excess speed, which is caused by an energy store 6, of a door leaf 4. The device 3 comprises a door control 16, a door drive 12 and the door leaf 4, wherein the door drive 12 is coupled with the door leaf 4 by means of a coupling device 18. The door leaf 4 is displaceable, preferably horizontally displaceable, between an open position and a closed position. The door drive 12 can be arranged at, for example, an elevator car of the elevator installation, in which case the illustrated door leaf 4 can be a component of a shaft door. In such a case the coupling device 18 additionally comprises a known car-door/shaft-door coupling. If the electrical energy supply is intact both the door control 16 and the door drive 12 are usually supplied with energy from an electrical energy source 22. The device 3 additionally comprises an energy store 6, which is coupled to or can be connected with the door leaf 4. The energy store 6 serves for providing a closing force in order to close the elevator door 2, for example in the case of a failed electrical energy supply, and in that way to guarantee the safety of the elevator installation. Potential energy is usually supplied to the energy store 6 by displacement of the door leaf 4, which is connected with the energy store 6, into the open position. The energy stored in that way has the concrete effect that the door leaf 4 executes the closing movement SB when this closing force and thus the closing movement SB no longer oppose, for example, a holding moment of the door drive 4.

Figure 2:
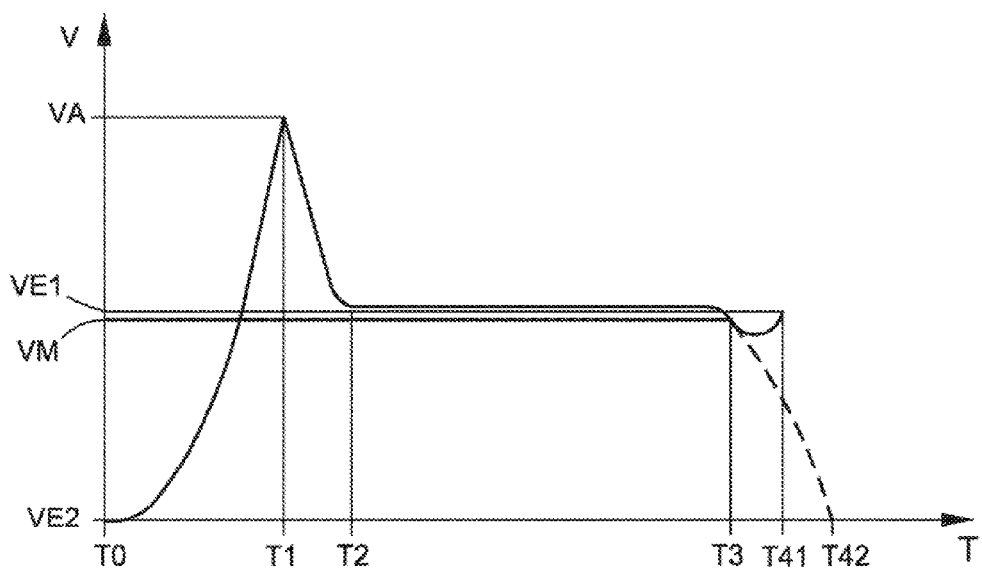
FIG. 2 shows a speed plot of a door leaf after failure of the electrical energy supply.

FIG. 2 shows a speed plot of a door leaf shown in accordance with FIG. 1, in which a speed V of movement of the door leaf is depicted over time T.

The electrical energy supply fails at an electrical energy failure point of time T0, wherein the door leaf is not in the closed position of the elevator door. As an alternative to the variant shown in FIG. 2, the speed of the door leaf at the electrical energy failure time point T0 can be unequal to zero. This means that the electrical energy supply can fail during a door closing movement or door opening movement. The failure of the electrical energy supply equally causes deactivation of the door control. In addition, as a consequence of the absence of the holding moment exerted by the door drive on the door leaf when the electrical energy supply is intact, the door leaf is accelerated by a closing force up to an activation time point T1. This closing force is generated by means of the illustrated energy store coupled with a door leaf. During this acceleration phase an electrical energy which rises with time T, but which still cannot cause door control activation, is generated in the door drive, because the electrical energy induced by the door drive is still not sufficient for activation of the door control or because a switching-on process of the door control is still not concluded.

On reaching the activation time point T1 the door leaf has an activation speed VA, at which the door control is shifted into an operational state or is activated. The activated door control is constructed in such a manner that it produces regulation of the movement speed V of the door leaf. For this purpose, the door control comprises at least one sensor or encoder. The sensor or the encoder produces speed information signals allowing a conclusion about the speed of the door leaf to be made. Regulation of the movement speed V can be carried out, for example, by means of a PI regulator. The door control brakes the closing movement of the door leaf so as to, for example, reduce a kinetic energy, which is elevated above the appropriate legal standard, of the door leaf. Starting from the activation time point T1 and up to a time point T2 the door leaf is accordingly braked to a movement speed V equal to or higher than a minimum movement speed VM.

As an alternative thereto the regulation of the movement speed V can take place in such a manner that merely further increase of this movement speed V is prevented.

A reduction, which is contrary to this alternative, of the movement speed V below this minimum movement speed VM has the effect that the electrical energy induced by the door drive is no longer sufficient to keep the door control in the operational state. This falling below of the minimum movement speed VM shall preferably be prevented as long as possible, because without additional measures such a falling below causes deactivation of the door control and thus renewed acceleration of the door leaf until reactivation of the door control.

The movement speed V is regulated between the time point T2 and a deactivation time point T3 following thereon in such a manner that the minimum movement speed VM is not fallen below.

On reaching the closed position of the door leaf the door can be abruptly braked, which leads to deactivation of the door control at the deactivation time point T3. However, such an abrupt braking is not problematic, because the kinetic energy of the door leaf is already sufficiently minimized by virtue of the preceding regulation. On the other hand, the movement speed V at the deactivation time point T3 can be reduced by regulation of the door control to below the minimum movement speed VM when the door leaf has reached or almost reached the closed position. In order to make such regulation possible before reaching the closed position the door control comprises a sensor element for generating a position information signal. Consequently, sufficient electrical energy in order to keep the door control in the operational state can no longer be generated by the door drive. It is possible with such regulation of the movement speed that, for example, the door leaf already adopts the closed position at the deactivation time point T3, which equally leads to abrupt braking of the door leaf.

As an alternative to this regulated reduction in the movement speed V it is possible that the potential energy of the energy store is no longer sufficient to maintain not only the movement speed V of the door leaf, which is at least the minimum movement speed VM, but also the provision of electrical energy for operation of the door control. Behavior of that kind is possible if, for example, a closing spring is used as energy store.

After deactivation of the door control it is possible for the door leaf to be accelerated again by the energy store. This is so if the deactivation point T3 arrives before the door leaf is completely closed. Because within a short time the closed position of the door leaf with an end movement speed VE1 will be reached at a closing time point T41 and accordingly, for example, a maximum speed not to be exceeded cannot even be reached, it is possible that no further braking measures are required. The mentioned maximum speed not to be exceeded can be determined by a mass of the kinetic energy of the door leaf, which is not to be exceeded with respect to legal standards. Notwithstanding this, the door leaf on reaching its closed position is abruptly braked. However, such abrupt braking is not problematic, because the kinetic energy of the door leaf has already been sufficiently minimized by the preceding regulation.

As an alternative thereto, the door drive can comprise components, for example mechanical buffers, which enable continued braking of the door leaf notwithstanding non-activation of the door control. A plot of the movement speed V in accordance with this alternative after deactivation of the door control is illustrated in FIG. 2 by a dashed line. In execution of this alternative the door leaf can have an end movement speed VE2 equal to zero at a closing time point T42.

Both the activation time point T1 and the deactivation time point T3 can be dependent on the spring constant, which applies in the case of a closing spring used as energy store, and on parameters of the elevator door. Such parameters of the elevator door are, for example, the mass of the door leaf and the characteristic factors applicable to the door drive.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A device for preventing excess speed of a door leaf caused by an energy store, comprising:
   a door drive displacing the door leaf between an open position and a closed position;
   the energy store coupled with the door leaf, the energy store providing energy for a closing movement of the door leaf upon a failure of an electrical energy supply connected to the door drive, the closing movement moving the door leaf in a direction from the open position to the closed position;
   the door drive being coupled with the door leaf wherein electrical energy is induced in the door drive when the closing movement of the door leaf takes place; and
   a door control which actuates the door drive and which regulates a movement speed of the door leaf when the failure of the electrical energy supply occurs, wherein the door control is operated by the induced electrical energy.

2. The device according to claim 1 wherein the door control is activated in response to a predetermined activation speed of the door leaf.

3. The device according to claim 1 wherein the door control is operable in response to the movement speed being equal to or higher than a predetermined minimum movement speed of the door leaf.

4. The device according to claim 1 wherein the door drive includes an electric motor.

5. A method of operating an elevator door comprising the steps of:
   providing an energy store that produces a closing movement of a door leaf of the elevator door when an electrical energy supply for a door drive coupled to the door leaf fails;
   the closing movement of the door leaf causing induction of electric energy in the door drive; and
   providing a door control operated by the induced electrical energy to control the door drive when the electrical energy supply fails wherein the door control regulates a movement speed of the door leaf.

6. The method according to claim 5 activating the door control in response to a predetermined activation speed of the door leaf.

7. The method according to claim 5 wherein the regulation of the movement speed produces braking of an accelerated closing movement of the door leaf.

8. The method according to claim 5 wherein the door control causes regulation of the movement speed to be greater than or equal to a predetermined minimum movement speed to maintain operation of the door control.

9. An elevator door with a door leaf and a device for preventing excess speed of the door leaf caused by an energy store, the device comprising:
   a door drive for displacing the door leaf between an open position and a closed position;
   the energy store coupled with the door leaf, the energy store providing energy for a closing movement of the door leaf upon a failure of an electrical energy supply connected to the door drive, the closing movement moving the door leaf in a direction from the open position to the closed position;
   the door drive being coupled with the door leaf wherein electrical energy is induced in the door drive when the closing movement of the door leaf takes place; and
   a door control which actuates the door drive and which regulates a movement speed of the door leaf when the failure of the electrical energy supply occurs, wherein the door control is operated by the induced electrical energy.

* * * * *